June 26, 1923.
K. A. SIMMON
1,460,182
PISTON PACKING
Filed April 9, 1919
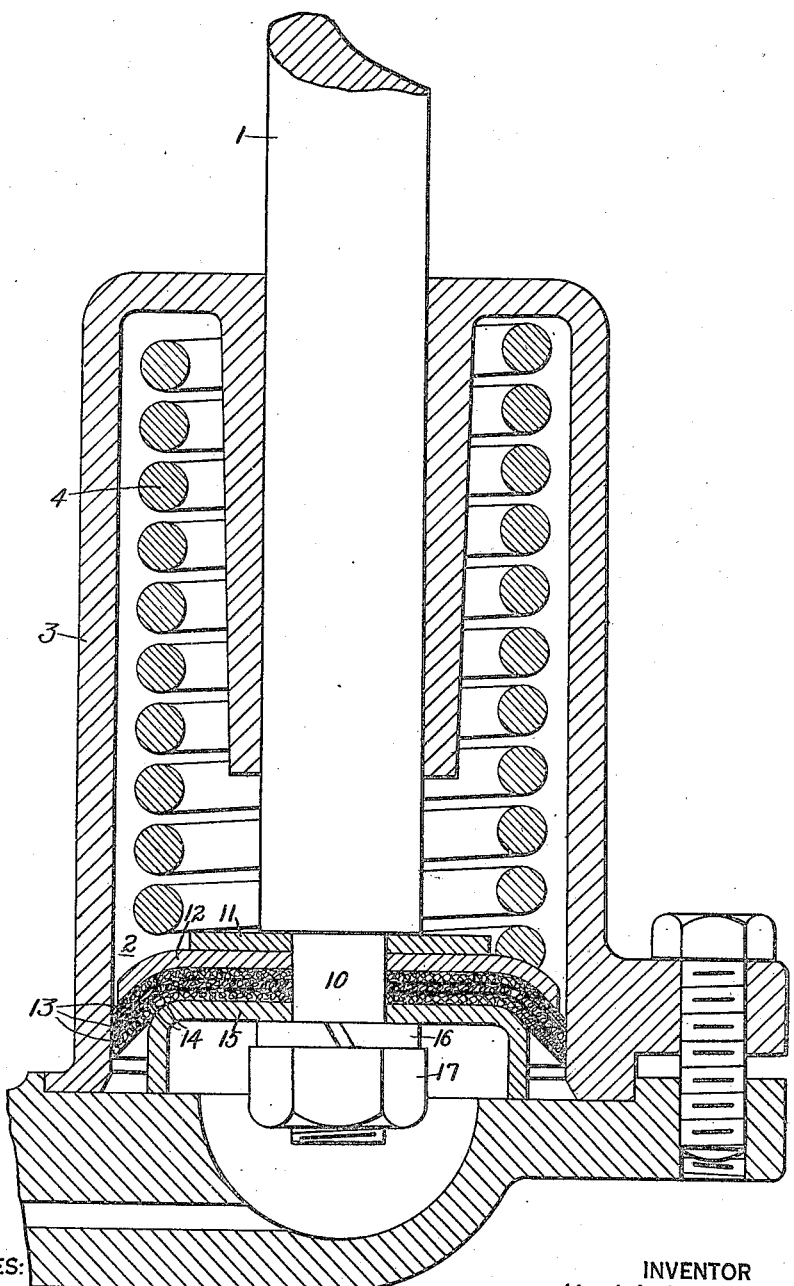
WITNESSES:
J. A. Helsel.
W. R. Coley
INVENTOR
Karl A. Simmon.
BY
Wesley G. Carr
ATTORNEY Patented June 26, 1923.

1,460,182

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

PISTON PACKING.

Application filed April 9, 1919. Serial No. 288,857.

*To all whom it may concern:*

Be it known that I, KARL A. SIMMON, a citizen of the United States, and a resident of Edgewood Park, in the county of Allegheny and State of Pennsylvania, have invented a new and useful Improvement in Piston Packings, of which the following is a specification.

My invention relates to control apparatus of the fluid-operated type, and particularly to piston packing for use in the air cylinders that are commonly employed in railway-motor-control systems of the electropneumatic type.

The object of my invention is to provide a piston packing comprising a layer of relatively porous material sandwiched between layers of dissimilar fibrous material for producing a packing that is impervious to fluid pressure.

More specifically stated, it is the object of my invention to provide a piston packing comprising alternate layers of inferior-grade leather which is penetrable by air pressure, and closely woven fibrous material, such as paper or treated cloth, which is impervious to air pressure, whereby a relatively inexpensive, but thoroughly reliable and durable, piston packing is secured.

My invention may best be understood by reference to the accompanying drawing, wherein the single figure is a view, in longitudinal section, of a piston-and-cylinder device which embodies a piston packing constructed in accordance with the present invention.

Referring to the drawing, the structure here shown comprises a piston rod 1, the lower end of which is fitted with a piston 2 for traveling within an operating cylinder 3, the piston being biased towards the illustrated lower position by means of a coil spring 4.

While the present invention is particularly adapted for use in connection with the illustrated type of air cylinders for operating the well-known unit switches, it will be understood that the invention is not so restricted in its application, but may be employed in any case where a relatively inexpensive piston packing impervious to air pressure is desired.

The lower end 10 of the piston rod 1 is of reduced diameter, to provide a suitable annular shoulder against which the piston 2 is assembled. The piston comprises a supporting plate or washer 11, which is placed in direct engagement with the above-mentioned shoulder, a resilient backing or dished plate 12 of a familiar type, three layers 13 of relatively porous material, such as inferior-grade leather, a plurality of layers 14 sandwiched between the layers of leather 13, and composed of some closely woven or non-porous material, such as paper or treated cloth or flexible metal sheets, and a cup-shaped supporting and stop member 15, the entire piston being tightly positioned upon the reduced-diameter portion 10 of the piston rod by means of a suitable lock-washer 16 and nut 17, in accordance with a familiar practise.

It will be seen that I have thus provided a piston packing which is impervious to air pressure, and is of durable construction, but which is relatively inexpensive, by reason of employing an inferior grade of leather which it has not been previously possible to utilize because of its great porosity. While the invention is especially adapted to use with such low-grade leather, if desired, high-quality leather may be utilized to more completely seal the pores therein, and thus enable a higher degree of air-pressure than before to be successfully used.

It will be appreciated that my invention is not restricted to the specific embodiment that I have shown, or to the particular use that I have described, since various modifications of the invention may be made without departing from the spirit and scope thereof. I desire, therefore, that only such limitations shall be imposed as are indicated in the appended claims.

I claim as my invention:

1. A cup piston packing comprising a layer of relatively porous material, and a dissimilar fibrous material applied thereto for sealing the pores therein.

2. A piston packing comprising inferior-grade leather and non-porous fibrous material located on opposite sides thereof for sealing the leather pores.

3. A piston packing comprising alternate layers of inferior-grade leather penetrable by air-pressure and closely-woven fibrous material impervious to air-pressure.

4. A cup piston packing comprising a layer of relatively porous material sandwiched between layers of dissimilar fibrous material for producing a packing impervious to fluid-pressure.

In testimony whereof, I have hereunto subscribed my name this 31st day of March, 1919.

KARL A. SIMMON.